Sept. 23, 1947.    E. A. TUBBS    2,428,001
OUTPUT CABLE FOR SIGNAL GENERATORS
Filed Aug. 31, 1944
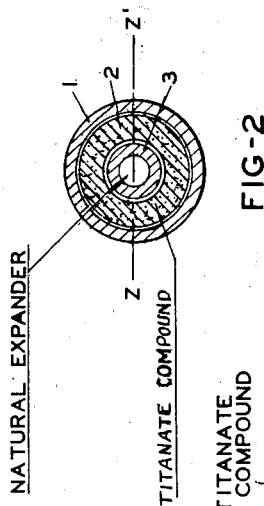
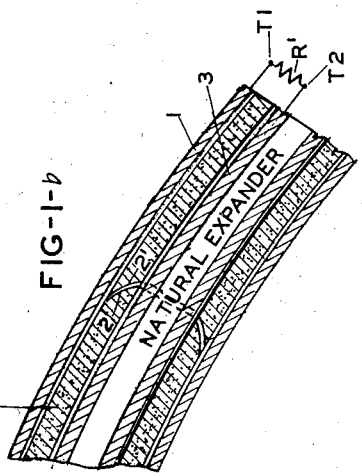
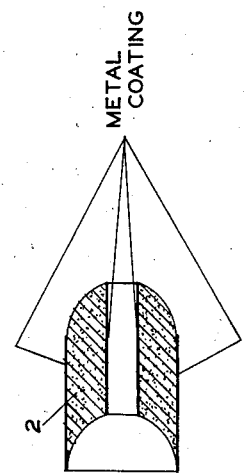
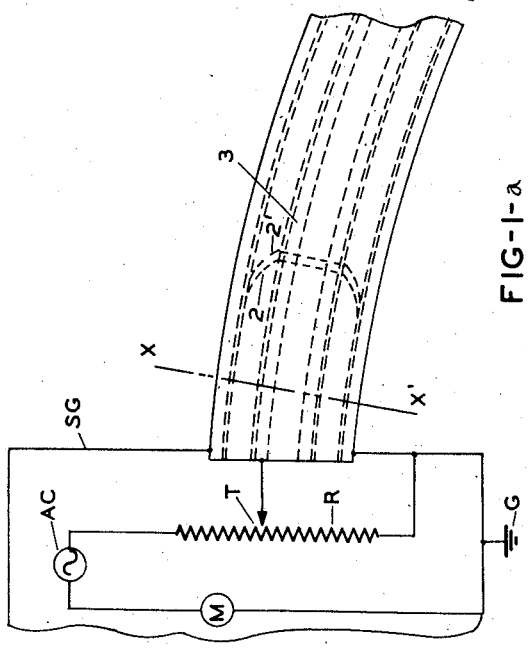
ERNEST A. TUBBS
INVENTOR
BY
ATTORNEY Patented Sept. 23, 1947

2,428,001

UNITED STATES PATENT OFFICE 2,428,001

OUTPUT CABLE FOR SIGNAL GENERATORS

Ernest A. Tubbs, Woodside, Long Island, N. Y.

Application August 31, 1944, Serial No. 552,072

11 Claims. (Cl. 178—44)

My present invention broadly relates to a special form of transmission of electrical energy, and more particularly relates to conductively transmitting electrical alternating current energy as distinguished from transmitting the same through space. As such, it is a continuation-in-part of an application for Letters Patent of the United States filed by me on April 9, 1942, which was given Serial No. 438,224.

A particular object of my present invention is the provision of means for more efficiently transmitting electrical alternating current energy conductively, and particularly with uniformity over very wide ranges of high, very high and ultra high frequency forms of the same.

For certain forms of conductive electrical alternating current energy transmission, particularly in cases of such transmission at very high and ultra high frequencies where uniformity over wide ranges of frequencies is called for, I have found it most essential to use transmission means having a very low characteristic or surge impedance. Outstanding examples of such essentiality are encountered in the cases of so-called output cables used in connection with so-called signal generators such as shown and described in Ferris Patent No. 2,265,637, granted December 9, 1941, in which characteristic or surge impedances of 30 and 200 ohms in connection with operating at frequencies up to 150 megacycles (which I term very high as distinguished from ultra high in connection with my present treatment of the subject) are mentioned.

As is well known in the electrical communications art, signal generators are so highly specialized that even in spite of the super production efforts brought on by the present war only an exceedingly very few institutions have so far undertaken to manufacture and market them compared to what has been done in related fields in order to meet the exceedingly large war demands. However, since signal generators are universally used for checking whether or not mass produced radio receivers and the like are correctly built to properly receive at each one of the many high, very high and ultra high frequencies as the case may be for which they were planned and designed, the responsibility for delivering them with the technological perfection so eminently required has fallen upon an exceedingly small number of technologists with the final step of technological perfection resting on technological perfection of the output cable, and especially so now that demands have reached the point of calling for a single output cable for a single signal generator covering with margin to spare the super range of 40 to 250 megacycles, as they have. In my Patent No. 2,293,227 of August 18, 1942, relating to a signal generator output cable, as especially treated therein, I had reached a certain point of technological perfection in the output of such a cable for a lower super range of frequencies, and I have now found that further technological perfecting is needed in working towards maintaining uniformity of output as the frequency of operation increases beyond 175 megacycles I before tackled.

Many pages could be written by me on the eccentric reactions of output cables of signal generators on being fed the respective energies of electrical alternating currents of frequencies even as low as 50 megacycles, but since it was quite fully done by C. J. Franks, pages 16 to 18 of "Electronics" of August, 1936, published by the McGraw-Hill Publishing Co., Inc., of New York, in describing the invention of the said Ferris, supra, his employer, my present reference thereto is intended to incorporate herein the information contained therein in connection with explaining the distinctive purport of my present invention.

As brought out by the said Franks write-up, the shorter the output cables of signal generators designed to operate at the very high frequencies he mentions are made the less manifest do the eccentric reactions become, but as further brought out, in order not to cramp the style of the daily user of the same so to say, a compromise has to be made on a flexible output cable of the order of three feet in length. Clearly then, a compromise that may be acceptable for operating up to the 100 megacycles that the said Franks names automatically becomes a more or less poor compromise for operations around 200 megacycles if the length of the output cable is to irrevocably remain substantially fixed, and since no acceptable basis has been found for overriding the said compromise, I have been forced to attain and have attained the objects of my present invention with a signal generator output cable of the order of three feet in length.

In an apparent effort to make this compromise effective up to 150 megacycles, the Ferris patent, supra, quite laudably for the date and experience involved called for terminating the fixed in length output cable of his signal generator with a resistance as free from reactance as possible having a resistance value equal to the characteristic or surge impedance of his cable, admitting, however, that due to the impossibility of obtaining strictly pure resistances the consequential inherent reactance characteristic of such resistances would cause the respective losses at different frequencies to increase in response to increasing frequency. By curve A of my patent, supra, Fig. 2 of the drawing, I show the large extent to which Ferris was correct in the matter of pyramiding losses with increase of frequency from 5 to 175 megacycles in the case of terminating a 3-foot output cable in a 30 ohm as good as obtainable from the best of commercial sources resistance.

For reasons that will be stated later, I have found that if a substantial reduction be made in the 30 ohms characteristic or surge impedance of the 3-foot signal generator flexible output cables involved, heretofore thought to be about the minimum possible with the means available, there results in the practices involved substantial lessening of the previous recognized losses even at frequencies considerably higher than the 150 megacycles to which Ferris limited himself with a consequential better approach to uniformity of the terminal voltages for the mass checking of the responsive charateristics of the said radio receivers and the like. Accordingly, it is a principal object of my present invention to make the particular change without injecting in the output cables involved undue complications.

While certain objects of my present invention have been more or less specifically identified, it is believed that other objects will become readily apparent to those skilled in the art from the description to follow.

In the drawings like symbols are intended to represent substantially like in kind or like in function elements.

Fig. 1a is a partial view of how my present invention is put into use; Fig. 1b supplements Fig. 1a as a cross-sectional view of the output end of a typical output cable conforming to my present invention; Fig. 2 is a cross-section on the line XX' of Fig. 1a; and Fig. 3 displays in greater detail one of the important elements of the means of my present invention. Fig. 2 indicates in line ZZ' that Fig. 1b is a cross-section of it, line XX' being intended as a cross-section indicator of any part of the 3-foot output cable.

Referring to Fig. 1a, the symbol SG indicates a cabinet of a signal generator, and for a typical example of a signal generator reference is made to the drawings of Ferris Patent No. 2,037,160 of April 14, 1936, only a few of the details of which I need to display in describing my present invention to a satisfactory extent. Such cabinets are always made of some metal suitable for confining internal electrical radiation to the internal confines of the same so that the working component of the energy transmitted by the usual cable is not subject to interference therefrom; and it is usual to ground the cabinet at some point such as that marked G.

To be a signal generator there must be within the cabinet a generator of electrical alternating current as symbolically indicated by the element marked AC, and for the high, very high and ultra high frequencies involved electronic generators of well known form are the only ones so far capable of doing what is required; and they are so versatile that by working them with a multiplicity of switchable in, different bands of frequencies circuits, generation of electrical alternating currents of frequencies ranging from less than one megacycle to hundreds of megacycles can be had. Nearly all signal generators include an audible frequency modulator of the generated electrical alternating currents as indicated by the element marked M in circuit with element AC to give the checkers of radio receivers and the like a signal to which to listen.

In order that the checker may have measures of the strengths of the signals being listened to in terms of voltage, the generated and modulated electrical alternating signal current is caused to flow through a potential developer such as the indicated resistance R, and to make the strength of the signal suit the particular device being checked an adjustment of the potential being developed can be made as by the indicated adjustable tap T. All standard signal generators have visible scale so-called vacuum tube voltmeters that give the desired voltage readings.

In order to have the signal alternating currents thus developed reach the terminals of the device being checked, one conductor is used as an outgoing path and another conductor as a return path, and in all cases a generous degree of flexibility of the combination is paramount. To meet these requirements, I prefer to use flexible braided metal, different diameter tubing of which Belden products of the kind are familiar examples, which tubing I place in coaxial relation as indicatively displayed in the case of the elements marked 1 and 3. As indicated, conductor 1 is in conductive contact with the lower end of resistance R though the metal cabinet SG and the conductor 3 is in direct conductive contact with the tap T of the resistance R, as a result of which the conductor combination may be constantly fed with an electrical alternating current signal of any one frequency of determined potential at the input end at least.

Referring to Fig. 1b, conductors 1 and 3 are terminated in a common thereto resistance R', but as elaborately treated by Franks and Ferris, supra, in spite of the very short travel involved, things can happen across resistor R' that have no resemblance to what is constantly happening across the tapped portion of resistance R in the matter of the respective developed therein potentials expressed in terms of voltages. However, as written up by Franks, Ferris found much better matching of uniformity of input and output voltages in the range of 20 to 100 megacycles, and in his patent the same in the range of 20 to 150 megacycles, after taking the step of making the resistance of R' closely match the characteristic or surge impedances of the output cables dealt with.

To check a device, its input has to be connected to terminals T1 and T2 spanning resistance R', and even though the impedance thus introduced in parallel with R' is in all cases comparatively high but not the same for different in design devices, there is unavoidably some reduction in the resulting combination impedance thus brought in on terminating the output cable. However, it is clear from a mathematical point of view that the smaller the resistance value of R' is the lesser will be the percentage reduction in the effective impedance.

It is also technologically axiomatic that if things can be worked out so as to make it possible to reduce the resistance of R' to considerably below the 30 ohms (the minimum with which Ferris, supra, dealt), its resultant inherent inductance will consequently be correspondingly reduced considerably. Since the reactance of inductance, inherent or artificial, to electrical alternating current increases with increases of frequency, it is readily apparent that the more the inherent inductance of R' can be reduced the more uniform will its natural impedance to varied in frequency electrical currents such as in the super wide range of variations so essential to the usefulness of signal generators be.

It is further technologically axiomatic that, other things being equal, the losses of energy in signal generator output cables in traveling from input to output can be reduced by the simple procedure of cutting down length, but, as before brought out, for important practical reasons the industry would not tolerate any material reduction below the standardized three feet long in vogue. It is also quite well known that, other things being equal, the characteristic or surge impedance of standard 3-foot output cables is reducible through reduction of the closeness of conductors 1 and 3 to each other, but that due to the technological essentiality that the insulation therebetween be substantially perfect, a limit in this respect has been reached which accounts for having to limit design on the basis of a 30 ohm value for resistance R'.

I have found that, with all other things being as stated, by substituting for all of the insulation that accounts for the minimum of 30 ohms value by a material principally composed of titanate compounds, such as titanium dioxide, I am able to obtain, with the aid of certain designing to be described later, characteristic or surge impedances running to as low as the order of one-tenth of the said minimum 30 ohms, and consequently can reduce the resistance of R' to the order of 3 ohms.

An ideal way to accomplish this substituting would be the one of making a 3-foot long tube of a selected titanate compound having a one-piece closely fitting conductor through the center thereof and a one-piece closely fitting conducting tube surrounding the same, but in the present case I am not in a position to override the fact that generous flexibility is paramount. In order to fully meet this requirement of generous flexibility and yet lose very little of the maximum gainable, I proceed as follows:

Referring to Fig. 2, the indicated flexible tube 3 is indicated as filled by the body of any "natural expander," by which I mean anything that is so contracted that by reason of its natural tendency to expand it constantly presses outwardly on all of the interior of tube 3, examples of which may be a properly proportioned spiral spring and/or a properly proportioned length of solid rubber. There is further indicated spacing between tubes 1 and 3 measured by the difference between the outside radius of tube 3 and the inside radius of tube 1, further indicated as being fully filled by an element 2 which I specifically identify as being of a material principally composed of titanate and preferably the one known as titanium dioxide. Because this material per se is too rigid to participate in the generous flexibility of my output cable goal, I fully fill up the space involved with a sufficient number of specially designed bead-like elements of it as indicated by the elements 2 and 2' of Figs. 1a and 1b in order that my said goal may be reached. The special bead-like design is more fully displayed in Fig. 3 which is a longitudinal and vertical cross-sectional view of a single one of my bead-like elements. By limiting the length of the bead-like elements, and thereby increasing the total number needed to obtain substantially complete filling of the space involved, the generous degree of flexibility sought for my output cable is satisfactorily obtained.

By cupping one end of my bead-like element, as indicated, and terminating the other end of the same in an extension shaped to closely match the said cupping, as also indicated, an apparent improvement in cable flexibility is obtained along with the result that there is an apparent very small departure from a complete filling of the space involved with the desired titanate compound material.

Due to the consequential bending of the conductor elements 1 and 3 inherent to flexibility and the inherent longitudinal straightness of the external and internal surfaces of my bead-like element, there is a consequential apparent tendency for the adjacent surfaces of conductors 1 and 3 not to remain in physical and/or electrical contact with each and every part of the respective surfaces of the respective bead-like elements, which imperfect contacting will apparently vary considerably under different degrees and directions of bending of my cable, to thereby correspondingly vary the characteristic or surge impedance of the same.

Since such parasitic variations in characteristics or surge impedance of output cables would be absolutely intolerable in checking with a signal generator work, I make use of two eradication of them steps. First, that by subjecting all of the internal wall of conductor 3 to the constant over-all outward pressure of a housed therein "natural expander," I force contacts with the surfaces of the bead-like elements that would otherwise be lacking. Second, that by superimposing conductive metal coatings on the inner and outer surfaces of my bead-like element, as more definitely indicated in Fig. 3, I gain conconductive spreading out of such contacts as are made to all points not actually contacted both as to between conductor 3 and the respective bead-like elements and as to between conductor 1 and the respective bead-like elements. In other words, from an electrical point of view, the said metal coatings are thus made in effect integral with the correspondingly located metal of conductors 1 and 3. I have found that this combination of steps makes the eradiction of the parasitic actions involved substantially perfect.

After putting together a signal generator output cable in accordance with the terms of my present invention, its characteristic or surge impedance can best be determined by a trial and error process of terminating it with different resistors of as pure resistance as obtainable and drawing an output voltage curve from data obtained from operating the signal generator over the range of frequencies in which interested for each one of the resistors used. The resistor whose curve shows the best over-all uniformity of output voltages is the one that best represents the characteristic or surge impedance answer sought.

In the ever increasing checking with signal generators having 30 ohm terminated output cables it has reached the point where in the case of many newly developed things to be checked the full 30 ohm output voltages, even though reduced to the practical minimum of input, have turned out to be far too much for the new devices, and efforts to tap off some portion of any too high voltage to meet these new requirements have resulted in so far upsetting the original proper termination of the output cable involved that only haphazard, unreliable checking has resulated. With my termination reduced to such a low ohmage, namely, of the order of 3 with reasonably careful design, it is consequently easy to modify the usual signal generator design so as to meet with satisfaction these new low voltage requirements.

While in general it is best to use as a terminating resistor in all signal generator practices one having a construction that makes its impedance as purely resistive only as possible, certain construction requirements may result in the output cable per se having a characteristic or surge impedance in itself not purely resistive, so that in such cases the inherent reactive component of a chosen terminating resistor may join in on making a termination impedance that matches or more nearly matches the involved characteristic or surge impedance. If not, better performance can be had by associating with the chosen resistor an element imparting to it that amount of reactance necessary to bring about more perfect matching.

On connecting to a device to be checked, it automatically follows that there is a placement of the inherent distributed capacitance between the leads in parallel to the terminating resistor, the value of which being very small, upsets very little the termination matching for operations at low frequencies, but it does become decidedly upsetting for operations at ultra high frequencies in cases of terminations of 30 ohms and above. Also, the input grid-to-cathode impedance of any radio device being checked noticeably decreases to upsetting extents for operations at ultra high frequencies, which is another compelling reason for going after very low ohmage characteristic or surge and terminating impedances in order to arrive at sufficient technological perfection for operations above 175 megacycles.

To one not acquainted with the facts, my drawing woud naturally give the impression that my cable is so bulky in its cross-sectional make-up that it cannot be looked upon as practically flexible enough, but such is not the case. In fact, the actual cross-sectional dimensions with materials now commercially available are many times less than those actually appearing. The much larger dimensions have been utilized only for the purpose of giving more readily perceptible delineations to the respective elements.

While I have described my present invention in certain confined respects, it is apparent that modifications may be made and that no limitations are intended other than those imposed by the scope of the appended claims.

What I claim as new, and desire to secure by Letters Patent of the United States is as follows:

1. An output cable for a signal generator capable of producing predetermined potentials of electrical alternating currents of a wide range of ultra high frequencies and impressing the same upon input means at the input end of the said cable, comprising a pair of coaxially related tubular conductors of the order of three feet in length so closely spaced from each other and insulated from each other by a material principally composed of a titanate compound that the resulting characteristic impedance of the said cable is considerably less than thirty ohms and a resistance substantially equal in ohms to the characteristic impedance of the said cable connected across the otherwise free output ends of the said pair of conductors.

2. The output cable of claim 1 in which the material insulating the pair of conductors from each other is principally composed of titanium dioxide.

3. The output cable of claim 1 in which the pair of conductors are so closely spaced from each other that the characteristic impedance of the same is of the order of three ohms.

4. An output cable for a signal generator capable of producing predetermined potentials of electrical alternating currents of a wide range of ultra high freqeuncies and impressing the same upon input means at the input end of the said cable, comprising a pair of coaxial related, generously flexible tubular conductors of the order of three feet in length, bead-like elements principally composed of a titanate compound each so proportioned as to closely fit in all of the space between the said flexible tubular conductors threaded onto the inner one of the said conductors in sufficient number to fill substantially all of the longitudinal space between the said conductors and each short enough to have the collection of them generously respond to the flexibility of the said conductors, the said conductors being so closely spaced from each other that the resulting characteristic impedance of the said cable is considerably less than thirty ohms and a resistor have a resistance substantially equally in ohms to the characteristic impedance of the said cable connected across the otherwise free output ends of the said pair of conductors.

5. The output cable of claim 4 in which the material insulating the pair of conductors from each other is principally composed of titanium dioxide.

6. The output cable of claim 4 in which the pair of conductors are so closely spaced from each other that the characteristic impedance of the same is of the order of three ohms.

7. The output cable of claim 4 in which those surfaces of the bead-like elements facing the inner wall of the outer tubular conductor have electrical conducting material coatings.

8. The output cable of claim 4 in which those surfaces of the bead-like elements facing the inner wall of the outer tubular conductor and the outer surface of the inner tubular conductor have electrical conductive material coatings.

9. The output cable of claim 4 in which the adjacent ends of the bead-like elements are respectively cupped and protruded so as to thereby closely overlap at the ends.

10. The output cable of claim 4 including a natural expander principally composed of rubber so completely occupying the entire hollow of the inner tubular conductor that substantially its entire inner wall is thereby constantly subjected to outwardly acting pressure.

11. The output cable of claim 4 including a natural expander principally composed of a springy material so completely occupying the entire hollow of the inner tubular conductor that substantially all regions of its inner wall are thereby constantly subjected to outwardly acting pressure.

ERNEST A. TUBBS.

REFERENCES CITED

The following references are of record in the file of this patent:

UNITED STATES PATENTS

| Number | Name | Date |
|---|---|---|
| 2,262,134 | Brown | Nov. 11, 1941 |
| 2,304,540 | Cassen | Dec. 8, 1942 |
| 1,642,754 | Singer | Sept. 20, 1927 |
| 2,277,177 | Wermine | Mar. 24, 1942 |
| 2,187,584 | Gothe | Jan. 16, 1940 |
| 1,818,027 | Affel | Aug. 11, 1931 |
| 2,387,783 | Tawney | Oct. 30, 1945 |
| 2,330,381 | Quayle | Sept. 28, 1943 |

FOREIGN PATENTS

| Number | Country | Date |
|---|---|---|
| 453,486 | Great Britain | Sept. 8, 1936 |